United States Patent

[11] 3,609,389

| | | |
|---|---|---|
| [72] | Inventor | John Ernst Bjorkholm |
| | | Holmdel, N.J. |
| [21] | Appl. No. | 3,140 |
| [22] | Filed | Jan. 15, 1970 |
| [45] | Patented | Sept. 28, 1971 |
| [73] | Assignee | Bell Telephone Laboratories, Incorporated |
| | | Murray Hill, Berkeley Heights, N.J. |

[54] PASSIVE PULSE TRANSMISSION MODE OPERATION IN A Q-SWITCHED LASER HAVING AN INTERNAL PARAMETRIC OSCILLATOR
6 Claims, 2 Drawing Figs.

[52] U.S. Cl. ......................................... 307/88.3,
331/46, 331/94.5, 331/96, 331/107 R
[51] Int. Cl. ......................................... H03f 7/04
[50] Field of Search .......................................... 307/88.3;
321/69; 331/94.5, 107

[56] References Cited
OTHER REFERENCES

Ammann et al., " Applied Physics Letters," Apr. 15, 1970, pp. 309–312, 307-88.3

*Primary Examiner*—Roy Lake
*Assistant Examiner*—Darwin R. Hostetter
*Attorneys*—R. J. Guenther and Arthur J. Torsiglieri ABSTRACT: Passive pulse transmission mode (PTM) operation is established in a Q-switched laser by means of a parametric oscillator located within the resonator of the laser which functions as a pump for the oscillator. The oscillator is adapted to deplete the pump at the moment the incavity pump power reaches a maximum, resulting in highly efficient conversion of pump power to signal and idler power. In one embodiment, one of the laser reflectors is made highly transmissive to the nonresonant signal radiation, and the oscillator is made singly resonant (SRO) at the idler frequency, resulting in a substantial fraction (ideally at least one-half) of the laser power being coupled out of the cavity in twice the round trip time of the laser resonator, but at the signal wavelength. Since the SRO is tunable, the short, high power output pulse is also tunable from the pump wavelength to longer wavelengths. Other embodiments utilizing doubly resonant oscillators and ring-type configurations are also disclosed.

INVENTOR
J. E. BJORKHOLM
BY Michael J. Urbano
ATTORNEY

PASSIVE PULSE TRANSMISSION MODE OPERATION IN A Q-SWITCHED LASER HAVING AN INTERNAL PARAMETRIC OSCILLATOR

BACKGROUND OF THE INVENTION

This invention relates to Q-switched lasers and, more particularly, to passive pulse transmission mode.

In a paper entitled "Theory of Laser Regeneration Switching," *Journal of Allied Physics*, 34, 1615 (1963), A. A. Vuylsteke set forth the basic principles of pulse transmission mode (PTM) operation of lasers as part of the general theory of laser regeneration switching. These principles, which are summarized in his U.S. Pat. No. 3,243,724 issued on Mar. 29, 1966, indicate that PTM operation is accomplished by pumping an active medium to produce a population inversion while the resonator, which includes the medium, is in a condition unsuited for regenerative action (i.e., low Q). At approximately the peak of the population inversion, the resonator is conditioned for regenerative action (i.e., made to be high Q). The resulting buildup of radiation by stimulated emission is accompanied by a decrease in the population inversion. At a time when the incavity radiation energy is near its maximum, the resonator is again conditioned unfavorably to regeneration and the radiation energy in the cavity is coupled out of the resonator in a relatively short time, resulting in a high power output pulse. With normal Q-switching techniques a longer pulse with lower peak power would be obtained.

Typical prior art techniques for achieving PTM operation employ relatively complicated active means such as an electro-optic Q-switch (e.g., a Kerr cell) to condition the resonator. The Kerr cell is employed to rotate the polarization of the laser radiation which is also transmitted through or reflected by a polarization sensitive element (e.g., a birefringent crystal). Active PTM schemes present the problem of accurately timing the commencement of the increase in output transmission with respect to the peak power of the incavity (Q-switched) pulse.

It is a broad object of this invention to produce short, high power pulses of frequency tunable coherent light.

It is another object of the present invention to produce passive pulse transmission mode operation in a laser and at the same time provide for tunability of the output frequency.

One passive PTM technique, disclosed in my copending application, J. E. Bjorkholm Case 1, Ser. No. 677,270 filed in Oct. 23, 1967 and assigned to the assignee hereof, utilizes a transmission switch comprising a saturable absorber disposed between a pair of closely spaced reflectors, one of which is a reflector of the primary laser resonator, to pulse the output transmission after a Q-switched pulse has started. The switch employs destructively interfering radiation feedback which does not begin to build up until just before the incavity Q-switched pulse reaches its maximum intensity.

Other prior art non-PTM techniques for obtaining short, higher power pulses involve pumping a parametric oscillator with short laser pulses (See my articles in *Applied Physics Letters* 13, 53,399 (1968). These techniques suffer, however, from several drawbacks: (2) the pulse width of the output is extremely variable and depends critically on pump power and pump pulse width; in PTM operation, however, the pulse width is approximately equal to the round trip time of the laser resonator; and (2) the output peak power is lower than in PTM operation because the oscillator is pumped by the power coupled out of the pump laser resonator which is lower than the incavity power of laser.

SUMMARY OF THE INVENTION

In accordance with the invention, passive pulse transmission mode (PTM) operation is established in a Q-switched laser by means of a parametric oscillator located within the resonator of the laser which functions as a pump for the oscillator. The oscillator is adapted to deplete the pump just as the incavity pump power pulse reaches a maximum, resulting in highly efficient conversion of pump power to signal and idler power. In one embodiment, one of the laser reflectors is made highly transmissive to the signal radiation, and the oscillator is made singly resonant (SRO) at the idler frequency, resulting in a substantial fraction (ideally at least one-half of the laser power being coupled out in twice the round trip time of the laser resonator, but at the signal wavelength. Since the SRO is tunable, the short, high power output pulse is also tunable from the pump wavelength to longer wavelengths. Other embodiments utilizing doubly resonant oscillators and ring-type configurations are discussed hereinafter.

BRIEF DESCRIPTION OF THE DRAWING

These and other objects of the invention, together with its various features and advantages, can be more easily understood from the following more detailed description taken in conjunction with the accompanying drawing, in which.

DETAILED DESCRIPTION

Figure 1:
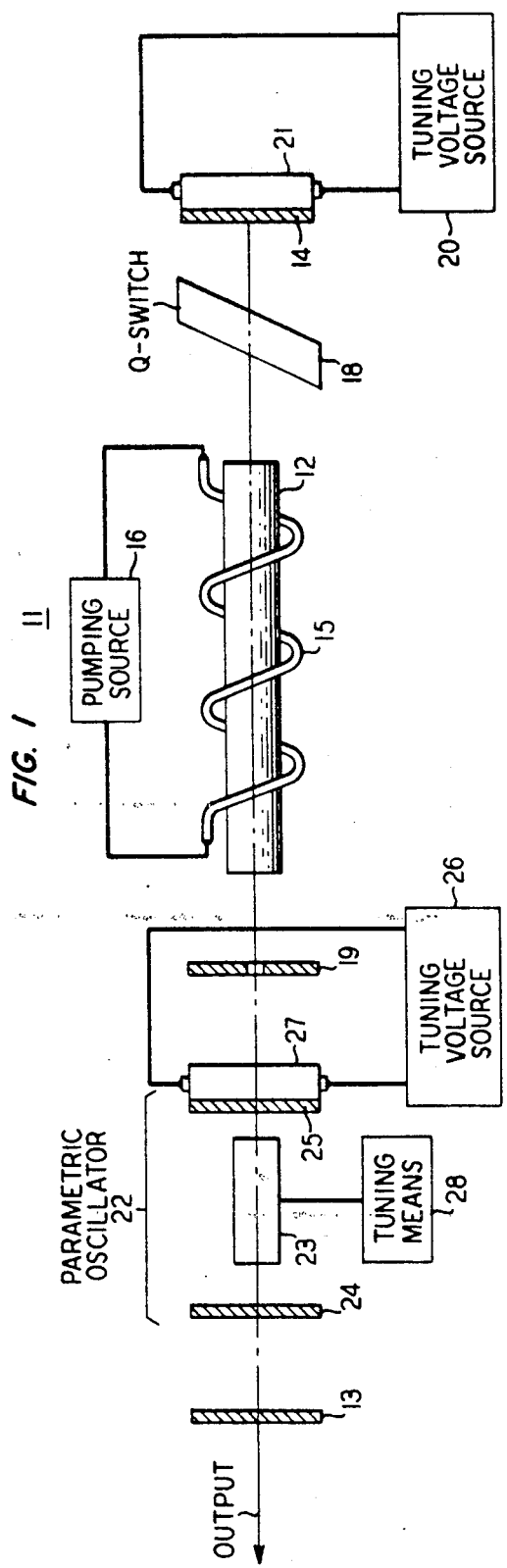
FIG. 1 is a partial pictorial and partial block diagrammatic illustration of a preferred embodiment of the invention.

Turning now to FIG. 1, there is shown an illustrative embodiment of the invention for achieving PTM laser operation comprising a Q-switched laser 11 which includes an active medium 12, illustratively a ruby crystal, a primary resonator formed by parallel reflectors 13 and 14, and pumping means including a xenon flash tube 15 and pulsed electrical power source 16. In addition, the laser includes Q-switching means 18, illustratively a saturable absorption cell, and mode selecting means, illustratively an apertured plate 19. The laser further illustratively includes means for tuning the primary resonator comprising a tuning voltage source 20 and piezoelectric crystal 21 upon which the high reflectivity reflector 14 is mounted.

The passive transmission switch employed in practicing my invention includes a parametric oscillator 22 disposed within the primary resonator and having its own longitudinal axis aligned with that of the primary resonator. The parametric oscillator comprises a parametric medium 23, illustratively a lithium niobate crystal, disposed in a secondary resonator formed by parallel reflectors 24 and 25. The medium 23, as well as the reflectors 24 and 25, should be highly transmissive to the pump radiation of laser 11. The parametric oscillator also includes resonator fine tuning means comprising tuning voltage source 26 and piezoelectric crystal 27, upon which high reflectivity reflector 25 is mounted, as well as coarse tuning means 28, (e.g., heating means, electric field means or crystal rotation means) coupled to medium 23.

Illustratively, the parametric oscillator 22 is a singly resonant oscillator (SRO) of the type described by me in two articles, *Applied Physics Letters*, 13, 53 (July 15, 1968) and *Applied Physics Letters*, 13, 399 (Dec. 15, 1968), which is also the subject matter of copending U.S. application Ser. No. 808,767 (Ashkin-Bjorkholm case 29–4) filed Mar. 20, 1969. The SRO is made to be singly resonant at the idler frequency, for example, by making the reflector 24 of the secondary resonator highly transmissive to signal radiation. As will be described hereinafter, under such circumstances the reflector 13 of the primary resonator is also made highly transmissive to signal radiation while at the same time being highly reflective to pump radiation from Q-switched laser 11. The SRO is preferred because of its tunability as well as its high efficiency resulting from the absence of power dependent reflections. In addition, the use of an SRO makes its positioning within the primary resonator uncritical and avoids phase problems which can arise when the signal, idler and pump all travel through the parametric medium in both the forward and backward directions. In such instances, with improper phase relationships, destructive interference can reduce the gain of the parametric oscillator to zero. The SRO reduces substantially this latter problem since only the signal or idler, not both, are resonant in the secondary resonator. Nonetheless a doubly resonant oscillator (DRO) can be utilized either in a ring-type configuration (FIG. 2) to insure that the pump radiation travels through the parametric medium in only one direction or in the arrangement of FIG. 1 provided that the phase of the pump is adjusted (as by translating reflector 14) and/or the phase of the signal with respect to the idler is adjusted (as by a KDP crystal, not shown, located in the secondary resonator) to prevent destructive interference.

The ruby crystal 12 is of the type conventionally used in Q-switched ruby lasers and comprises a small amount of chromium ($Cr^{+3}$) (0.05 percent concentration) in an aluminum oxide single crystal host. The dimensions of crystal 12 are illustratively 4 inches long by three-eighths inch in diameter. Nevertheless, it should be understood that a variety of other laser-active media, including all of those which can be Q-switched, can be employed in my invention.

The Q-switching cell 18 illustratively includes a liquid solution of cryptocyanine that is initially 50 percent transmissive and is contained within a container transparent to the pump radiation. Although other saturable absorbers could be used in Q-switching means 18, a liquid solution as described provides the capability of readily changing the initial transmission by changing the concentration of the solution. Active electro-optic Q-switching means, such as a Kerr cell, as well as a rotating reflector, could also be employed in place of passive Q-switch 18. Timing of the voltage pulse applied to an active Q-switch, however, does not present a problem in my invention, since the relative timing of the transmission switch (parametric oscillator 22) is solely determined by the properties of the parametric oscillator.

The pulsed pumping power from flashlamp 15 is illustratively 4,500 joules and the ruby radiation wavelength is about 6,943 A.

Although the mode selecting means 19 illustratively shown as a plate with a 2-millimeter diameter aperture in the light transmission path of the primary laser resonator, it should be understood that the desired mode can also be selected by a variety of other means, including, for example, the use of a single beam with the proper mode structure which illustratively could be injected at the start of the Q-switched pulse. Moreover, while mode control is desirable in a Q-switched laser, it is not necessary and can be dispensed with entirely. A single mode ruby laser is described in detail by me and R. H. Stolen in *Journal of Applied Physics*, 39, 4043 (1968).

Without mode control the initial transmission of Q-switch 18 may be substantially higher than the aforementioned 50 percent. The reasons for this are complex and derive from practical conditions desired for the onset of Q-switched oscillations. In all events, the Q-switching cell 18, when unbleached, has an initial transmissivity adequate to commence a Q-switched pulse and the parametric oscillator is adapted to start to strongly deplete the pump just before the Q-switched pulse power reaches its maximum value.

The parametric medium 23 is illustratively a 0.935 cm. long lithium niobate crystal having its faces cut at about 50° to its optic axis. Parametric interaction illustratively takes place in its $z-y$ plane with the pump radiation polarized in that plane. In such an arrangement the approximate signal and idler wavelengths are, respectively, 1.04 $\mu$ and 2.08 $\mu$. In an SRO with a nonresonant signal, the transmissions of reflectors 24 and 25 are typically 88 percent (ideally 100 percent) at 0.6943 $\mu$ and 90 percent (ideally 100 percent) at 1.04 $\mu$ and their reflectivities are 99.9 (ideally 100 percent) percent at 2.08 $\mu$. On the other hand, the reflectivities of reflectors 13 and 14 of the primary resonator are about 99.9 percent (ideally 100 percent) at 0.6943 $\mu$ and 13.0 percent at the nonresonant wavelength of 1.04 $\mu$. Ideally the reflectors 13 and 14 have 100 percent transmission at 1.04 $\mu$. In a DRO both mirrors 24 and 25 would illustratively have reflectivities of 98.6 percent and 98.0 percent at 1.04 $\mu$ and 2.08 $\mu$, respectively. The optimum reflectivity at 1.04 $\mu$ and 2.08 $\mu$ depends upon the use to which the invention is put and upon the oscillator losses. The transmission of these mirrors is about 90 percent (ideally 100 percent) at 6,943 A.

In operation, when the flashlamp 15 is fired, the pump radiation of laser 11 starts to build up in the primary resonator from noise ($\sim 10^{-10}$ watts). When the intensity of the pump radiation becomes great enough ($\sim 10^3$ watts), the passive Q-switching cell 18 bleaches and a giant pulse begins to form in the primary resonator. The pulse is not coupled out of the primary resonator due to the high reflectivity of reflectors 13 and 14 at the pump wavelength. Instead, the pump pulse propagates back and forth in the primary resonator, making two traversals of the parametric oscillator 22 in each round trip. As long as there is no pump depletion by the parametric oscillator, the pump radiation will build up as a normal Q-switched pulse. When the incavity pump power exceeds the threshold ($\sim 65$kW) of the parametric oscillator, oscillations will also build up in the secondary resonator thereof. By adjusting various parameters the oscillator can be adapted to start to strongly deplete the pump power just as the incavity pump power reaches a maximum. Where the parametric oscillator is an SRO the conversion of pump power to signal and idler can be very efficient (theoretically 100 percent), and with reflector 13 transparent to the nonresonant signal radiation, at least one-half of the pump power is coupled out of the primary resonator in a time $2L/c$ (where L is the optical length of the primary resonator and $c$ is the velocity of light) but at the signal wavelength. Since the SRO is readily tunable (by means 28), the high power (e.g., $10^6$ watt) short duration (e.g., $5\times10^{-9}$ sec.) output pulse is tunable from the pump wavelength to longer wavelengths.

Several parameters may be empirically adjusted to produce pump depletion just before the incavity pump pulse power reaches a maximum. These include decreasing the spacing of the reflectors of the secondary resonator and decreasing the diameter of the pump beam both of which reduce the buildup time of the oscillator, and decreasing the reflectivity of the reflectors of the secondary resonator which increases the threshold of the oscillator, thereby assuring that the oscillator remains "off" (i.e., does not start to strongly deplete the pump) until the incavity pulse power is nearly at a maximum.

Figure 2:
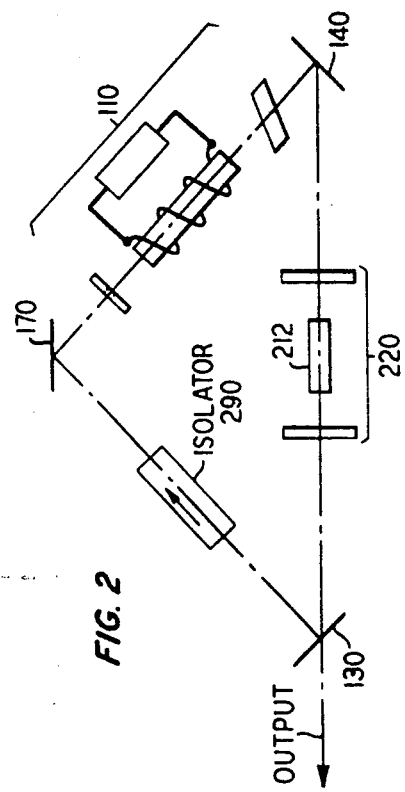
FIG. 2 is a schematic of a second embodiment of the invention.

It is to be understood that the above-described arrangements are merely illustrative of the many possible specific embodiments which can be devised to represent application of the principles of the invention. Numerous and varied other arrangements can be devised in accordance with these principles by those skilled in the art without departing from the spirit and scope of the invention. In particular, where a DRO is utilized as a passive transmission switch, destructive interference phase problems can be substantially reduced, as previously mentioned, by incorporating the DRO into a ring-type primary resonator, as shown in FIG. 2. The resonator is illustratively triangular in shape, comprising three reflectors 130, 140, and 170 all of which are highly reflective to pump radiation. A Q-switched pump laser 110 is located in one leg of the triangle between reflectors 140 and 170. An isolator 290 is also incorporated in the ring cavity to insure that the pump radiation builds up as a traveling wave traveling in the direction shown by the arrow. A parametric oscillator 220 is located in another leg between reflectors 130 and 140, the former reflector being highly transmissive to the signal or idler radiations or both, depending upon which are desired to be extracted from the oscillator 220. In this arrangement the pump travels through the parametric medium in one direction only and thus reduces phase problems even though a DRO is utilized. Additional reduction in such interference can be achieved by using an SRO in a ring-type arrangement, thus insuring that both the pump and nonresonant signal or idler travel through the medium in only one direction.

What is claimed is:
1. Optical pulse transmission mode apparatus comprising a Q-switched laser having a primary resonator for sustaining the build up of a Q-switched pump pulse of radiation, and a parametric oscillator having a secondary resonator disposed within said primary resonator, said oscillator being adapted to be pumped by said laser and to deplete said pump pulse power at a point in time when the power of said pulse in said primary resonator reaches its maximum.

2. The apparatus of claim 1 wherein said parametric oscillator is adapted to be singly resonant at only one of its idler or signal frequencies and nonresonant at the other of said frequencies, and said primary resonator is adapted to be in a high Q-condition for pump pulse radiation and a low Q-condition for radiation at said nonresonant frequency.

3. The apparatus of claim 2 in combination with means for frequency tuning said singly resonant oscillator.

4. The apparatus of claim 1 wherein said parametric oscillator is doubly resonant at its idler and signal frequencies and said primary resonator is in a high Q-condition for pump pulse radiation.

5. The apparatus of claim 4 wherein said primary resonator is a ring-type resonator having a plurality of legs, said oscillator being disposed in one of said legs.

6. The apparatus of claim 1 wherein said laser comprises a passively Q-switched laser.

UNITED STATES PATENT OFFICE
CERTIFICATE OF CORRECTION

Patent No. 3,609,389    Dated September 28, 1971

Inventor(s) John E. Bjorkholm

It is certified that error appears in the above-identified patent and that said Letters Patent are hereby corrected as shown below:

Abstract, line 6, after "power" insert --pulse--.

Column 1, line 59, after "drawbacks:" change "(2)" to --(1)--.

Column 3, line 36, after "19" insert --is--.

Column 4, line 30, delete "(e.g., 5 x $10^{19}$ sec.)" and insert --(e.g., 5 x $10^{-9}$ sec.)--.

Signed and sealed this 9th day of May 1972.

(SEAL)
Attest:

EDWARD M. FLETCHER, JR.              ROBERT GOTTSCHALK
Attesting Officer                     Commissioner of Patents